(12) United States Patent
Citton et al.

(10) Patent No.: US 11,339,548 B2
(45) Date of Patent: May 24, 2022

(54) SYSTEM FOR THE CLEANING OF RIVERS AND STREAMS

(71) Applicant: Mold Srl, Cassola (IT)

(72) Inventors: Andrea Citton, Romano d'Ezzelino (IT); Alex Citton, Romano d'Ezzelino (IT)

(*) Notice: Subject to any disclaimer, the term of this patent is extended or adjusted under 35 U.S.C. 154(b) by 0 days.

(21) Appl. No.: 17/271,516

(22) PCT Filed: Aug. 5, 2019

(86) PCT No.: PCT/IB2019/056634
§ 371 (c)(1),
(2) Date: Feb. 25, 2021

(87) PCT Pub. No.: WO2020/049379
PCT Pub. Date: Mar. 12, 2020

(65) Prior Publication Data
US 2021/0180277 A1 Jun. 17, 2021

(30) Foreign Application Priority Data

Sep. 3, 2018 (IT) .................. 102018000008303

(51) Int. Cl.
| | |
|---|---|
| *E02B 15/10* | (2006.01) |
| *B63B 21/20* | (2006.01) |
| *B63B 21/24* | (2006.01) |
| *C02F 1/40* | (2006.01) |
| *E02B 15/08* | (2006.01) |
| *E02B 15/06* | (2006.01) |

(Continued)

(52) U.S. Cl.
CPC ............ *E02B 15/104* (2013.01); *B63B 21/20* (2013.01); *B63B 21/24* (2013.01); *C02F 1/40* (2013.01); *E02B 15/06* (2013.01); *E02B 15/08* (2013.01); *C02F 2101/30* (2013.01); *C02F 2103/007* (2013.01)

(58) Field of Classification Search
CPC .......... E02B 15/06; E02B 15/08; E02B 15/10; E02B 15/104; B63B 21/24
USPC .......... 210/156, 170.05, 170.1, 242.1, 242.3, 210/747.6, 776, 923; 405/60, 63; 114/294
See application file for complete search history.

(56) References Cited

U.S. PATENT DOCUMENTS 3,618,768 A * 11/1971 Brown ................... E02B 15/105
210/242.1
4,732,105 A * 3/1988 Fisher ..................... B63B 21/34
114/294

(Continued)

FOREIGN PATENT DOCUMENTS

| CN | 107476269 | 12/2017 |
|---|---|---|
| DE | 202017002390 | 6/2017 |

(Continued)

*Primary Examiner* — Christopher Upton
(74) *Attorney, Agent, or Firm* — Themis Law

(57) ABSTRACT

A system for cleaning rivers and waterways in general includes one or more floating modules, each having a floating body and a rotating body provided with projecting elements configured to be positioned on the water surface, so that, when the rotating body rotates due to the thrusting action of the water current, the projecting elements move floating debris in a direction determined by its rotation direction towards an accumulation or recovery area.

11 Claims, 7 Drawing Sheets

(51) Int. Cl.
*C02F 101/30* (2006.01)
*C02F 103/00* (2006.01)

(56) References Cited

U.S. PATENT DOCUMENTS

| | | | | |
|---|---|---|---|---|
| 5,667,337 | A * | 9/1997 | Lazes | E02B 15/08 |
| | | | | 405/63 |
| 6,117,336 | A * | 9/2000 | Sachse | E02B 15/06 |
| | | | | 210/156 |
| 7,326,354 | B2 * | 2/2008 | Ferreira | E02B 15/06 |
| | | | | 210/776 |
| 7,485,235 | B2 * | 2/2009 | Kellett | E02B 15/104 |
| | | | | 210/170.05 |
| 9,267,256 | B2 * | 2/2016 | Sorstrom | E02B 15/10 |

FOREIGN PATENT DOCUMENTS

| | | |
|---|---|---|
| EP | 1643037 | 4/2006 |
| JP | H108437 | 1/1998 |
| WO | 2013171551 | 11/2013 |

* cited by examiner

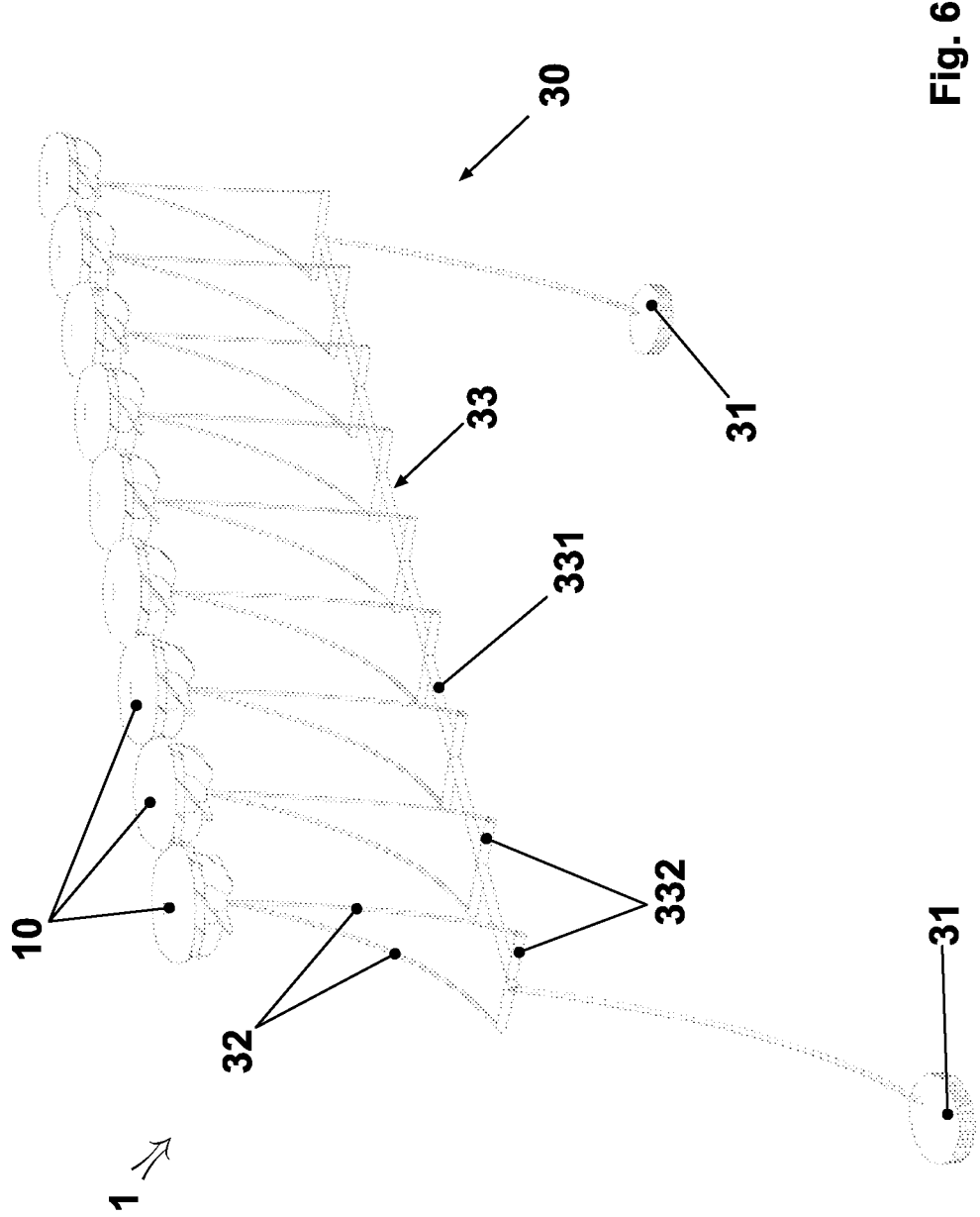

SYSTEM FOR THE CLEANING OF RIVERS AND STREAMS

The present patent is relevant to devices for cleaning rivers and in particular concerns a new system for cleaning rivers and watercourses in general.

Pollution from plastic, particularly of the seas, is a relevant and an ever-growing problem.

In fact, plastic is a long-lasting synthetic product that degrades completely only after hundreds of years and, as a result, huge amounts of plastic are accumulating in the seas, where they are disseminated by wind or urban dumps and above all by watercourses that flow into the sea. Part of the plastic is also released directly in the seas by the boats that sail them.

However, tests carried out on watercourses that flow into the sea have shown that they are the main conveyors of plastic materials into the sea. It has been determined that about 80% of the plastic that ends up in the seas comes from watercourses. Initially plastic waste is in the form of bottles, caps, detergent bottles, food packaging and packaging in general. When it enters the sea, plastic waste is dispersed and becomes virtually impossible to collect and recover. Furthermore, in sea water, plastic degrades and plastic waste breaks up into ever smaller fragments which end up being ingested by marine fauna, often causing poisoning or even suffocation, and thus entering our food chain.

It is therefore increasingly necessary to clean the rivers and watercourses that flow into the sea, to reduce the environmental impact of plastic materials and derivatives. The solutions currently applied to address these problems involve the use of personnel who, with the use of boats and nets, manually collect such waste with the consequent costs.

Another solution currently adopted involves performing cleaning operations after blocking the circulation of boats, thereby causing obvious inconveniences.

One drawback of this type of intervention is that it disturbs the ecosystem and in particular fish and marine fauna, birds, as well as the flora, since cleaning the river may also damage the seabed and coasts, while uprooting or damaging aquatic plants. Systems for cleaning rivers and watercourses in general based on fixed small draft nets are already known in the prior art. These nets have their ends anchored to both banks of the river or stream and are designed to keep their position even for a long period of time and during the rainy season. However, when installed, those nets prevent the regular circulation of boats.

The prior art also includes the use of floating dams consisting of floating structures suited to collect the floating waste carried by the currents. This system also prevents the free circulation of boats and even collects organic materials such as canes and light trunks, which become mixed with the plastic.

Document CN 107476269 A concerns a device to capture and remove floating waste from the anchor cables of vessels. The device is constrained to the boat by means of a rigid arm and comprises a floating element which is free to rotate due to the water flow and a motor with sensors which, in the event the floating element gets stuck, forces its rotation.

The device is designed so as to stay close to the anchor cable, that is, it is not free to move laterally, for example due to the thrust of a floating body having a greater mass than normal waste, such as a trunk or another vessel. Therefore, in the case of a collision with an object of the aforementioned type, the device thus designed, is likely to break.

Document JP H108437 A concerns a system for the collection of debris from a watercourse where the floating devices used to divert the water flow are constrained to a rigid structure like a dam across the watercourse. This system is not suitable for collecting waste with masses larger than normal floating waste and is also not designed to move in order to enable a boat to pass, for example. In fact, this system is not designed to be installed in navigable waters.

To overcome all the aforementioned drawbacks a new system for cleaning rivers and watercourses in general was developed and constructed.

The main object of the present invention is to collect floating waste and convey it to a collection area.

Another object of the present invention is not to interrupt or prevent the normal navigation of vessels always enabling them to circulate, since the floating modules comprising the system in question move as a consequence of the thrust of the vessels themselves, with no need to equip the modules with motors or drive them with external equipment.

A further object of the present invention is not to create any disturbance to the ecosystem.

One advantage of the present invention is that it is modular and therefore adaptable to the dimensions of the watercourse to be treated.

Another advantage of the present invention is that such modules can be produced in series, with a significant reduction of molding costs.

These and other, direct and complementary objects are achieved by the new system for cleaning rivers and watercourses in general, consisting in its main parts of one or more floating modules, where each module comprises:
 a floating body, suited to float on water;
 at least one rotating body constrained to said floating body;
 means suited to rotate said rotating body, as a result of the thrust of the current of the watercourse;
 anchoring means of said floating body at a fixed point;
and where said rotating body comprises protruding elements with at least one radial component and configured so as to be positioned at least partly on the free surface of the water so that, when said rotating body rotates due to the thrust of the water current, said protruding elements move any floating debris in a direction determined by its direction of rotation, towards an accumulation or recovery area.

Said rotating body, for example, comprises substantially radial blades or a brush, where said protruding elements are bristles.

Said means for rotation are, for example, blades constrained to the rotating body and intended to be at least partially submerged, so that, when subjected to the thrust of the water, they cause the rotation of the rotating body and consequently of said protruding elements.

Alternatively, said blades of said rotating body may be configured so that, when the module is positioned in the water, a part of said blades is submerged and is subjected to the thrust of the water, causing the rotation of the body, and a part is above the surface of the water, so as to displace the floating debris.

Alternatively, the module may comprise a water mill, constrained to said floating body and mechanically connected to said rotating body, so that the rotary motion of the mill is transferred to the rotating body.

The new system conveniently comprises a plurality of said modules, placed close together, for example aligned in a transverse direction with respect to the direction of the water current, such that the floating debris intercepted by each module is moved towards the neighboring module and, in succession, towards said accumulation and recovery area, where a debris collection device can be conveniently located.

Said anchoring means are flexible, for example, comprising at least one flexible cable joined to said floating and ballasted body or in any case fastened to a fixed point, for example on the bottom of the watercourse, so that the floating body remains free to move on the free surface of water within a certain area or radius of action, due to various types of thrust and variations in the level of the free surface of the water.

In this way, said protruding elements of the rotating body only intercept and move light floating debris, while the module is moved, for example, in the case in which they intercept trunks or branches or boats of any type.

Thus, the modules do not interfere in any way with the circulation of boats and no motorization of the modules or part of them or any external intervention is necessary.

The characteristics of the present invention will be better clarified by the following description with reference to the drawings, attached by way of a non-limiting example.

FIG. 6 shows a possible embodiment of the anchoring means (30) of the modules (10), said anchoring means (30) comprising for example a rigid frame (33) anchored and ballasted and a plurality of flexible cables (32) with which the modules (10) are constrained to said frame (33).

The new system (1) for cleaning rivers and watercourses (F) in general is particularly and effectively usable in running watercourses.

Figure 1:
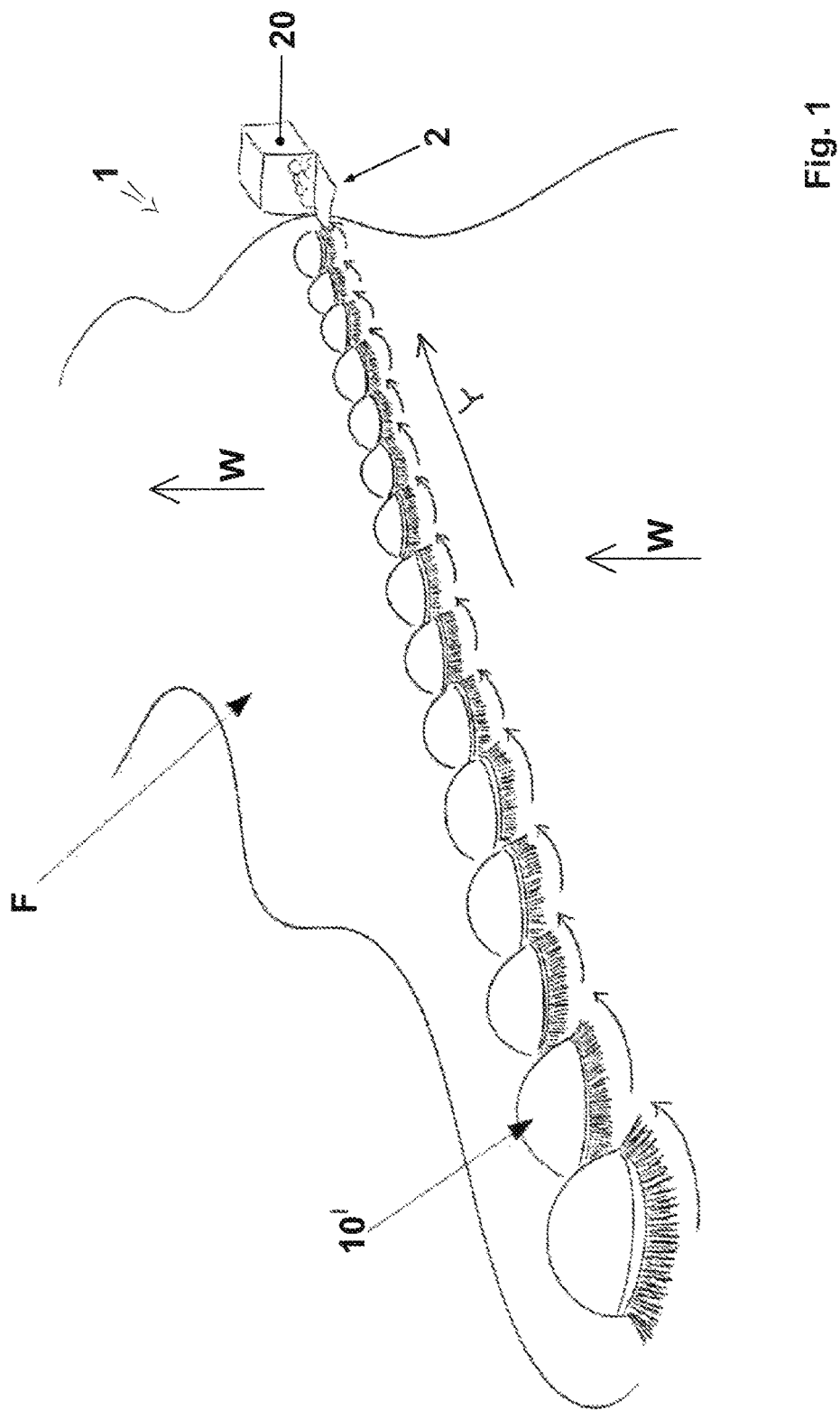
FIG. 1 shows a three-dimensional view of a possible arrangement of a plurality of modules (10) forming the system (1) for cleaning rivers and watercourses (F) in general.
Figure 2:
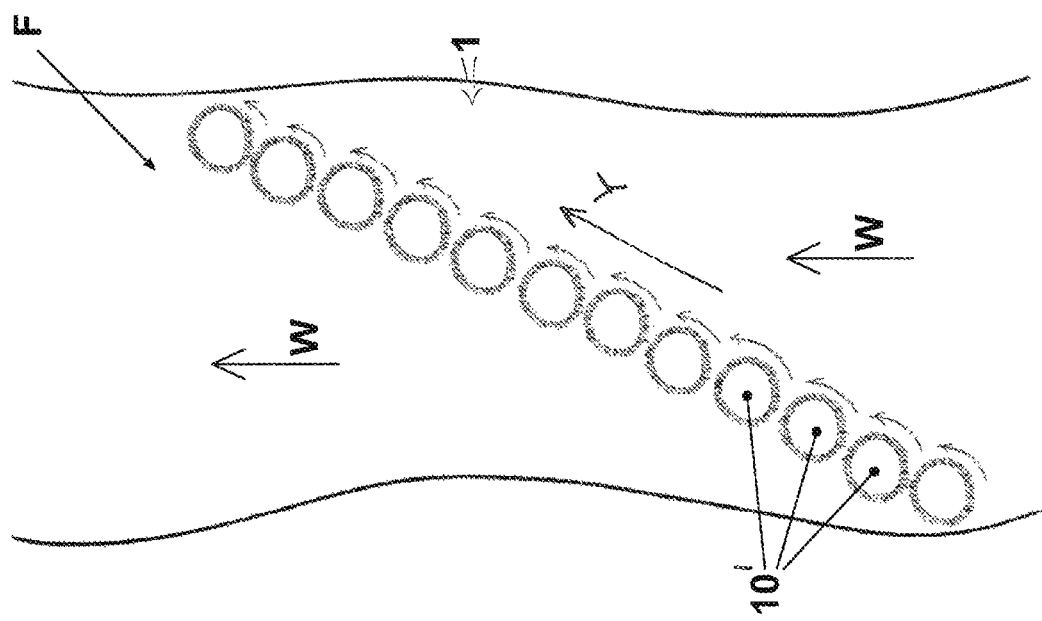
FIG. 2 shows the arrangement of FIG. 1 from above.
Figure 3:
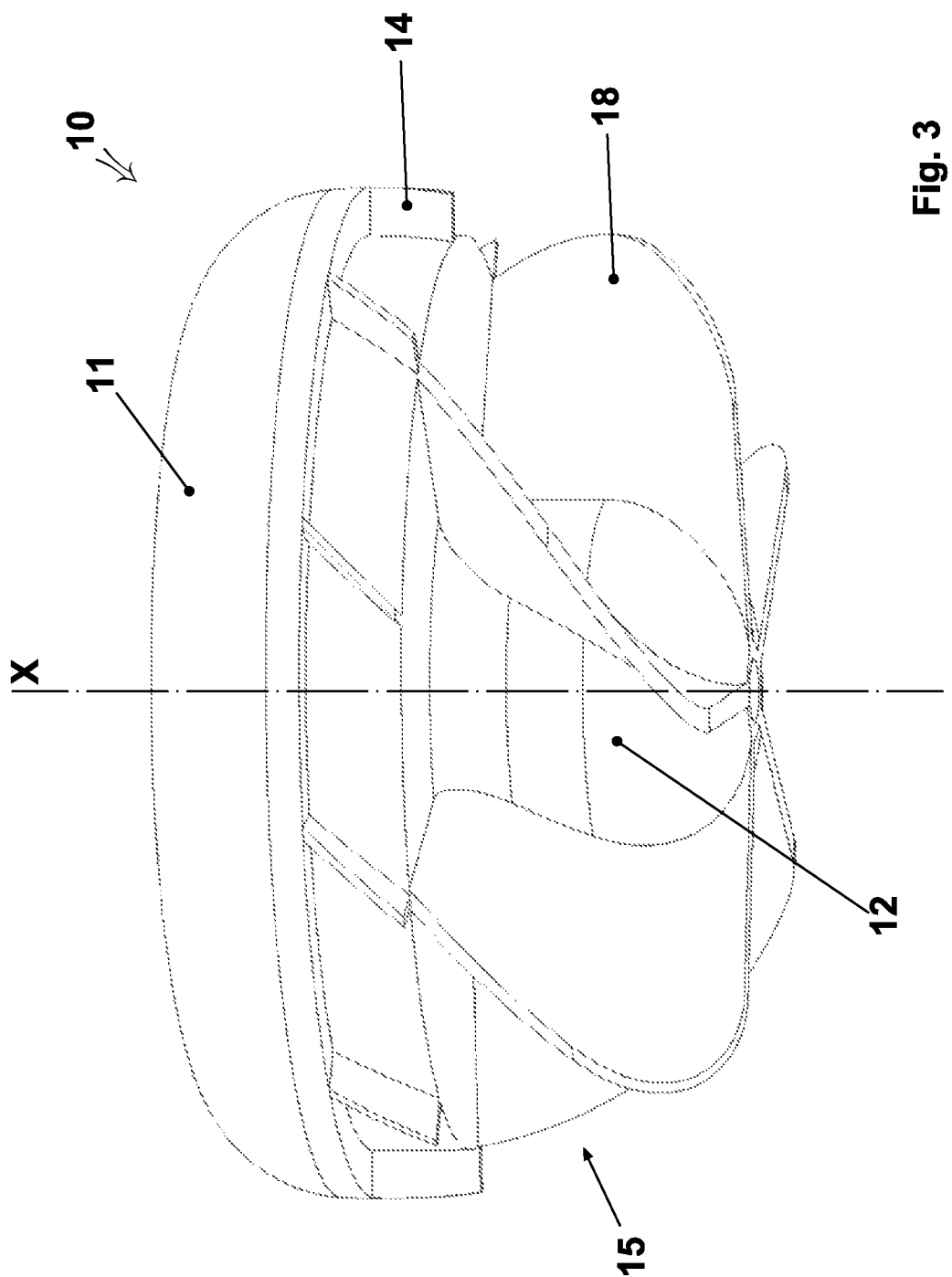
FIG. 3 shows a three-dimensional view of a module (10) in a preferred embodiment.
Figure 4:
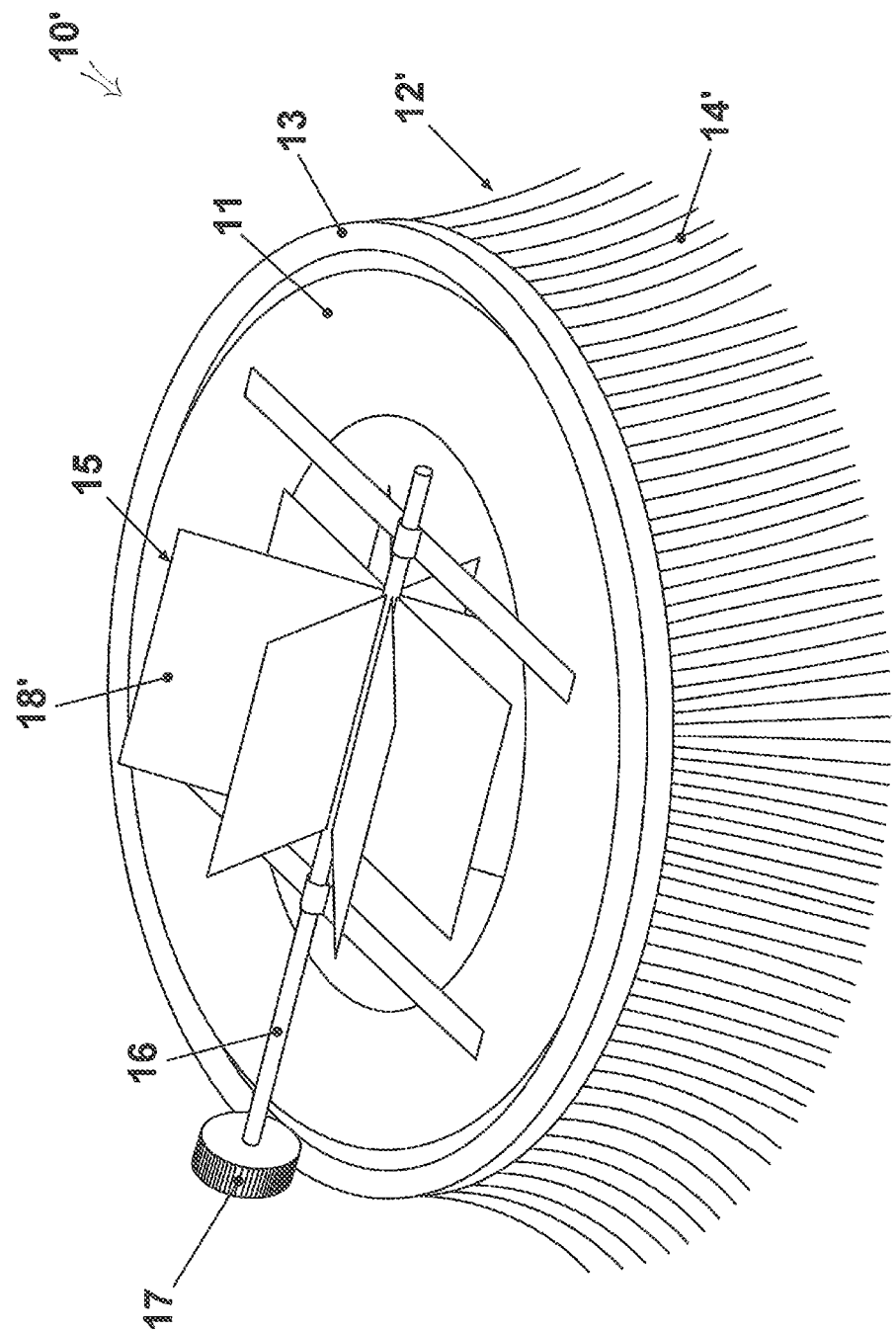
FIG. 4 shows a three-dimensional view of a module (10') in a possible alternative embodiment.
Figure 5:
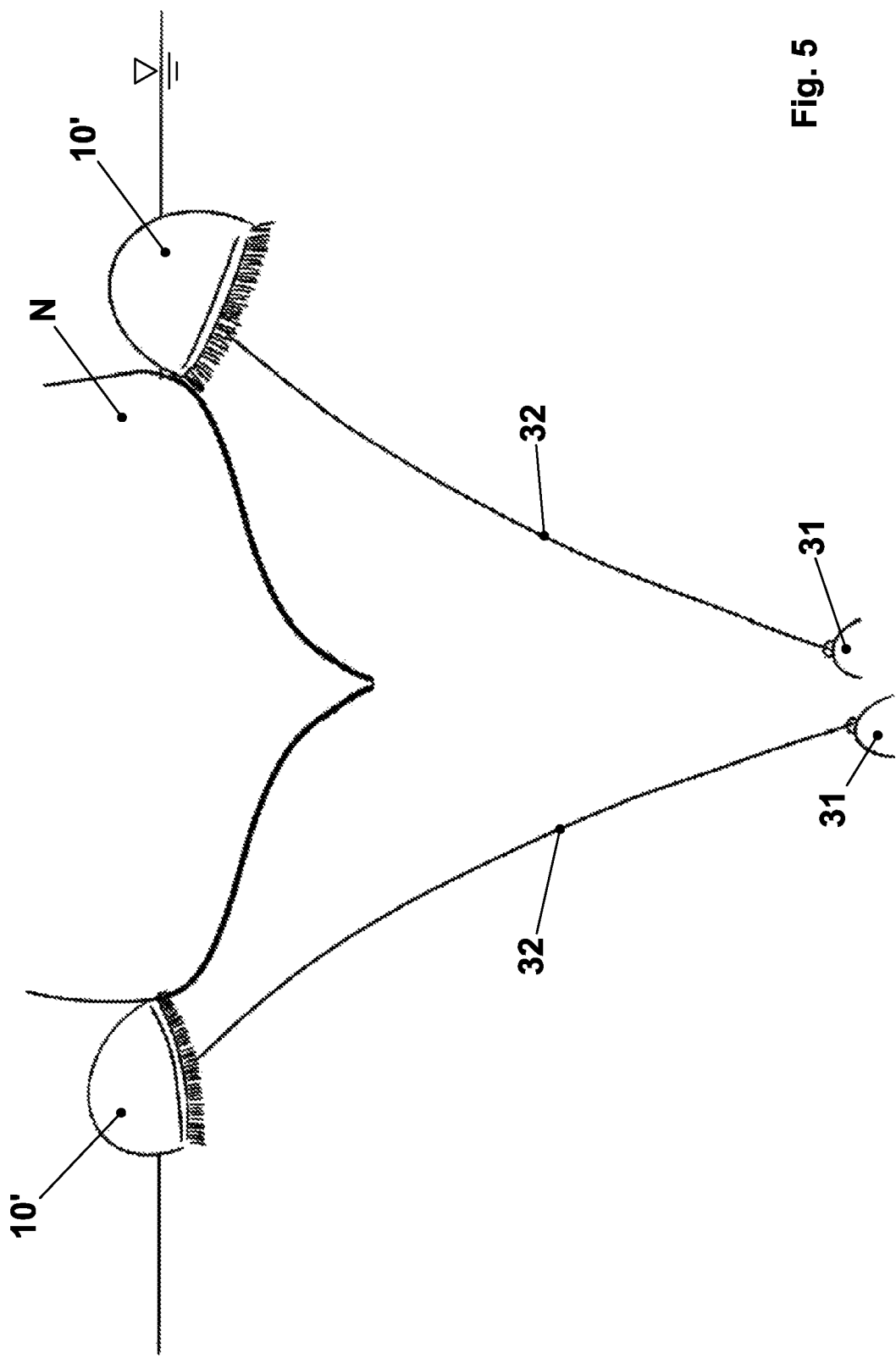
FIG. 5 shows how each module (10) is for example anchored to the bottom of the body of water by means of a flexible cable (32) so that it can move when a boat (N) passes between several modules side by side, without thereby hindering the circulation of vessels and without needing any motorization or any external intervention for its displacement.
Figure 6A:
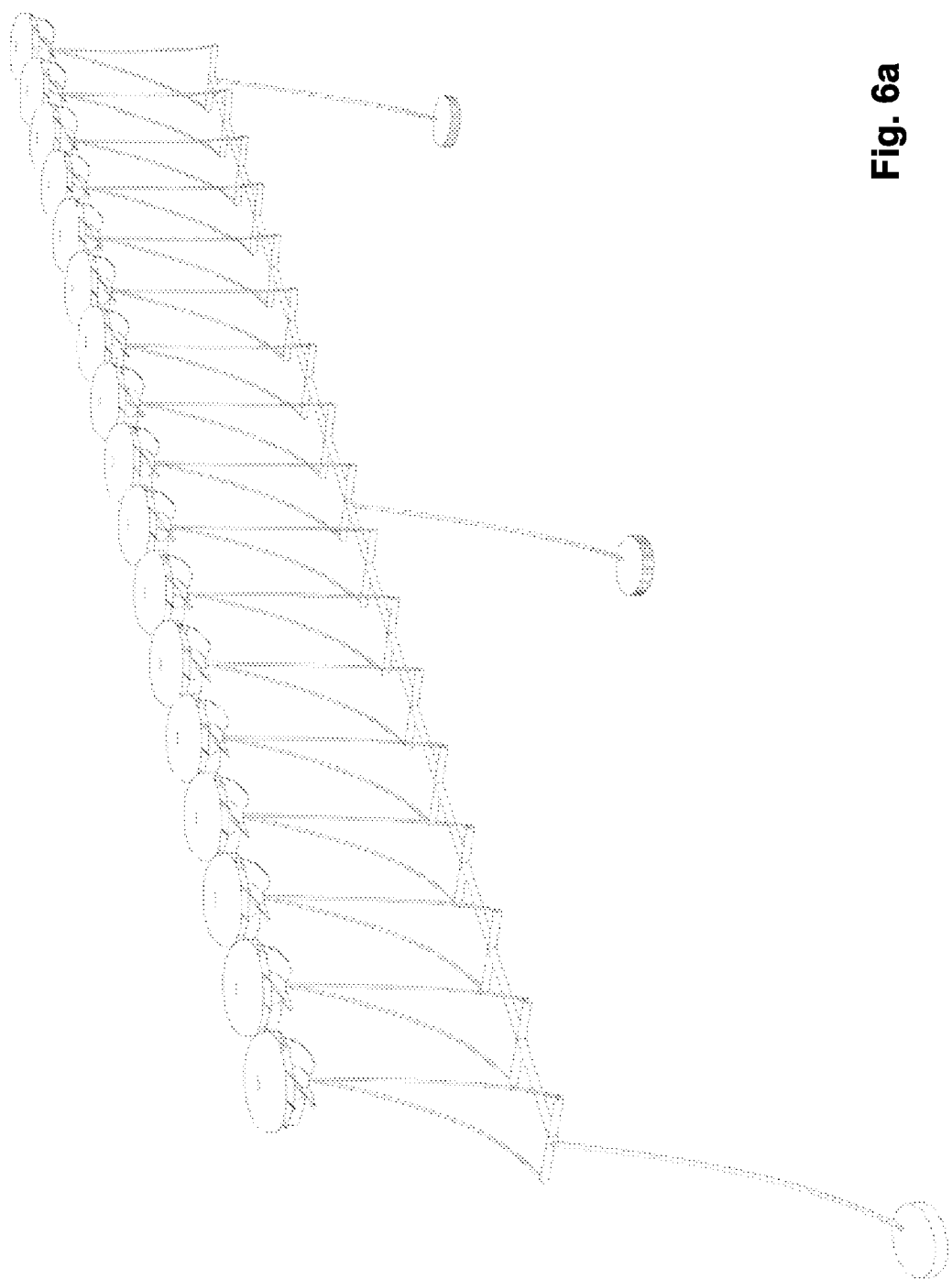
FIG. 6a shows how the system (1) may comprise any number of said aligned modules (10), with said frame (33) of any length, sized according to the width of the watercourse (F). It is therefore possible that the system (1) is also built to full width, without preventing the passage of vessels.

The new system (1) includes one or more floating modules (10). FIGS. 3 and 4 show examples of two embodiments. Each module (10) comprises a floating body (11), which may have any shape, for example substantially with a dome, annular, toroidal or spherical or in any case preferably with a central symmetry.

Said floating body (11) is able to float on the water, so as to support the other components of the module (10) at the level of the free surface of the water, as will be described and claimed below.

In the example in FIG. 3, said module (10) comprises a rotating body (12) constrained to said floating body (11) so as to be able to rotate with respect to the latter around an axis (X), for example orthogonal to the flotation plane of the floating body (11).

Said rotating body (12) is configured so as to be at least partially positioned on the free surface of the water and comprises elements protruding at least radially, for example radial fins (14), preferably homogeneously distributed on the circumference of said rotating body (12) so as to be positioned substantially on the free surface of the water.

Said module (10) also comprises means (15) suited to rotate said rotating body (12) due to the thrust of the water, and in particular said means (15) comprise a plurality of blades (18) distributed circumferentially on said rotating body (12), intended to be at least partially submerged and configured so that, when subjected to the thrust of the water in a given direction (W), they cause the rotation of said rotating body (12) in a given direction.

When said rotating body (12) rotates due to the thrust of the water on said blades (18), said radial fins (14) move any floating debris in a direction (Y) determined by the direction of rotation and towards an accumulation and recovery area (2).

In the example shown in FIG. 4, said rotating body is a brush (12'), constrained to said floating body (11) and configured so as to be substantially positioned at the level of the free surface of the water.

In the example shown in the figure, said brush (12') has a substantially annular shape, positioned around said floating body (11) and comprising a rigid ring (13) and a plurality of said protruding elements in the form of bristles (14') distributed on said ring (13) and facing downwards and/or radially.

Said brush (12') rotates on the free surface of the water, due to the thrust of the current of the water course. For example, said ring (13) of the brush (12') rotates with respect to said floating body (11).

Said module (10) also comprises means suited to rotate at least said brush (12') on the free surface of the water, wherein said means comprise, in the example in FIG. 3, a mill (15) constrained to said floating body (11) so as to be at least partially immersed in water, said mill (15) being mechanically connected to said ring (13) of the brush (12').

Due to the thrust of the current of the waterway, said brush (12') rotates and moves any floating debris in a direction (Y) determined by its direction of rotation, towards an accumulation or recovery area (2).

For example, said mill (15) comprises blades (18') which, partially immersed in water, are subject to the thrust of the current in a specific direction (W), and rotate, causing the rotation of a shaft (16) and a wheel (17) which transmits the rotary motion to said ring (13) of the brush (12').

Said module (10) further comprises anchoring means (30) to a fixed point, said anchoring means (30) comprising for example at least one flexible cable (32) constrained to said floating body (11) of the module and, by means of a ballast (31) or hooks, to the bottom of the watercourse or to another fixed point in the vicinity or in the watercourse.

The new system (1) conveniently comprises a plurality of said modules (10), placed aligned and close to each other, for example as shown in FIGS. 1, 2, 6 and 6a, in a transverse direction with respect to the course of the river (F), in such a way that the floating debris intercepted by a module (10) is moved within the range of action of the module (10) on its side, towards said recovery area (2), where there may be a device or container (21) for the collection of debris.

Since said aligned modules (10) are constrained by means of flexible cables (32), said modules (10) can move on the free surface of the water within a determined area, as a result of any thrust, as in the case in which they intercept a trunk, large debris, or a boat (N).

In the particular embodiment in FIG. 6, said anchoring means (30) comprise a rigid frame (33) in turn ballasted or in any case constrained to a fixed point, such as for example at the bottom of the watercourse (F), and where said modules (10) are all constrained by said flexible cables (32) to said rigid frame.

In the preferred embodiment said rigid frame (33) comprises a main linear bar (331), intended to be placed in a transverse direction with respect to the direction (W) of the watercourse, and a plurality of transverse bars (332) to which said flexible cables are constrained (32) in turn constrained to the modules (10), which, in the absence of external thrusts, are then also kept substantially aligned along a direction parallel to said main linear bar (331).

For example, each module (10) may be constrained to a transverse bar (332) of said frame (33) by means of a pair of said flexible cables (32), which therefore limit the movement of the modules (10) in water in a transverse direction with respect to the main linear bar (331), while they allow wider movements in a direction parallel to said main linear bar (331).

Therefore, with reference to the preceding description and the attached drawings the following claims are made.

The invention claimed is:

1. A system for cleaning rivers and waterways, comprising:
one or more floating modules,
wherein each floating module comprises:
a floating body adapted to float on water;
a rotary body constrained to said floating body, said rotary body having an axis of rotation perpendicular to a water surface;
rotation means for causing said rotary body to rotate due to a thrust exerted by a current of a waterway; and
anchorage means for anchoring said floating body to a fixed point;
wherein said rotary body comprises projecting elements having at least one radial component and configured to be at least partially positioned on a water surface so that, when said rotary body rotates due to the thrust exerted by the current of the waterway, said projecting elements move floating debris in a direction, which is determined by a rotation direction thereof, towards an accumulation or recovery area,
wherein said anchorage means comprise a cable constrained to a fixed point or to a bottom of the waterway, and
wherein said cable is flexible, so as to allow the floating module to move on the water surface within a predetermined area due to an effect of a thrusting action.

2. The system according to claim 1, wherein the system comprises a plurality of said floating modules and means suited to retain said floating modules arranged adjacently to one another and aligned according to at least one direction, so that, once positioned in the waterway and aligned crosswise with respect to a flowing direction of the water, the floating debris intercepted by one of the floating modules is moved to an operating area of an adjacent floating module, towards said accumulation or recovery area.

3. The system according to claim 2, wherein said anchorage means comprise a rigid frame ballasted or constrained to the fixed point or to the bottom of the waterway, and wherein said plurality of modules is constrained by said flexible cables to said rigid frame.

4. The system according to claim 3, wherein said rigid frame comprises a main linear bar, adapted to be placed in a transverse direction with respect to a course of the waterway, and a plurality of transverse bars, to which said flexible cables are constrained and in turn constrained to the plurality of the floating modules, which, in an absence of external thrusts, are aligned along a direction parallel to said main linear bar, and wherein said main linear bar has a length, depending on a size of the waterway in which the system is to be installed.

5. The system according to claim 4, wherein each floating module is constrained to said rigid frame by a pair of said flexible cables, which limit a movement of the floating modules in water in the transverse direction with respect to the main linear bar, while allowing wider movements in a direction parallel to said main linear bar.

6. A system for cleaning rivers and waterways, comprising:
one or more floating modules,
wherein each floating module comprises:
a floating body adapted to float on water;
a rotary body constrained to said floating body;
rotation means for causing said rotary body to rotate due to a thrust exerted by a current of a waterway; and
anchorage means for anchoring said floating body to a fixed point;
wherein said rotary body comprises projecting elements having at least one radial component and configured to be at least partially positioned on a water surface so that, when said rotary body rotates due to the thrust exerted by the current of the waterway, said projecting elements move floating debris in a direction, which is determined by a rotation direction thereof, towards an accumulation or recovery area,
wherein said anchorage means comprise a cable constrained to a fixed point or to a bottom of the waterway,
wherein said cable is flexible, so as to allow the floating module to move on the water surface within a predetermined area due to an effect of a thrusting action, and
wherein said rotation means comprise a plurality of blades, which are constrained or mechanically connected to said rotary body, are adapted to be at least partially submerged, and are configured so that, being subjected to a thrusting action of water in a first given direction, the plurality of blades causes a rotation of said rotary body in a second given direction.

7. The system according to claim 1, wherein said rotary body comprises a brush of annular shape, arranged around said floating body and comprising a rigid ring and a plurality of bristles distributed on a circumference of said rigid ring, and wherein said rigid ring of the brush rotates with respect to said floating body.

8. The system according to claim 1, further comprising a device or container for collecting the floating debris in said accumulation or recovery area.

9. The system according to claim 6, wherein said rotary body is constrained to said floating body so as to be able to rotate with respect to the floating body around an axis, and is configured in such a way said rotary body is at least partially positioned on the water surface and comprises a plurality of said projecting elements shaped as radial fins also configured so as to be positioned on a free surface of the water, and wherein, when said rotary body rotates owing to the thrust exerted by the current of the waterway on said blades, said radial fins move the floating debris in the direction, which is determined by a rotation direction thereof and towards the accumulation and recovery area.

10. The system according to claim 6, wherein said blades are distributed on a circumference of said rotary body and are configured so that, when the floating module is positioned in water, a part of said blades is submerged and is subjected to the thrusting action of the water, thus causing the rotation of the rotary body, and a part is above water level, so as to move the floating debris.

11. A system for cleaning rivers and waterways, comprising:
one or more floating modules,
wherein each floating module comprises:
a floating body adapted to float on water;
a rotary body constrained to said floating body;
rotation means for causing said rotary body to rotate due to a thrust exerted by a current of a waterway; and
anchorage means for anchoring said floating body to a fixed point;
wherein said rotary body comprises projecting elements having at least one radial component and configured to be at least partially positioned on a water surface so that, when said rotary body rotates due to the thrust exerted by the current of the waterway, said projecting elements move floating debris in a direction, which is determined by a rotation direction thereof, towards an accumulation or recovery area,
wherein said anchorage means comprise a cable constrained to a fixed point or to a bottom of the waterway,
wherein said cable is flexible, so as to allow the floating module to move on the water surface within a predetermined area due to an effect of a thrusting action,
wherein said rotary body comprises a brush of annular shape, arranged around said floating body and comprising a rigid ring and a plurality of bristles distributed on a circumference of said rigid ring, and wherein said rigid ring of the brush rotates with respect to said floating body, and
wherein said rotation means comprise a mill constrained to said brush in such a way that said mill is at least partially immersed in the water, wherein said mill comprises blades adapted to be at least partially immersed in the water and mechanically connected to said rigid ring of the brush, and wherein a rotation of the blades caused by the thrusting action of the water causes said ring to rotate.

* * * * *